(12) United States Patent
Purushothaman

(10) Patent No.: US 10,606,687 B2
(45) Date of Patent: Mar. 31, 2020

(54) PROCESS AUTOMATION ACTION REPOSITORY AND ASSEMBLER

(71) Applicant: Bank of America Corporation, Charlotte, NC (US)

(72) Inventor: Sasidhar Purushothaman, Hyderabad (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 273 days.

(21) Appl. No.: 15/830,206

(22) Filed: Dec. 4, 2017

(65) Prior Publication Data

US 2019/0171513 A1    Jun. 6, 2019

(51) Int. Cl.
| | |
|---|---|
| G06F 11/00 | (2006.01) |
| G06F 11/07 | (2006.01) |
| G06F 8/30 | (2018.01) |
| G06F 8/60 | (2018.01) |
| G06F 9/455 | (2018.01) |
| B25J 9/16 | (2006.01) |

(52) U.S. Cl.
CPC ......... G06F 11/0793 (2013.01); B25J 9/1605 (2013.01); G06F 8/30 (2013.01); G06F 8/60 (2013.01); G06F 9/455 (2013.01); G06F 11/079 (2013.01); G06F 11/0736 (2013.01); G06F 11/0751 (2013.01); G06F 11/0787 (2013.01)

(58) Field of Classification Search
CPC .............. G06F 11/0793; G06F 11/2257; G06F 11/2635; F06F 7/023
See application file for complete search history.

(56) References Cited

U.S. PATENT DOCUMENTS 5,907,709 A    5/1999    Cantey et al.
6,738,908 B1    5/2004    Bonn et al.
(Continued)

OTHER PUBLICATIONS

Kyoungho An, Resource Management and Fault Tolerance Principles for Supporting Distributed Real-time and Embedded Systems in the Cloud, Dec. 3, 2012, ACM, pp. 1-6. (Year: 2012).
(Continued)

*Primary Examiner* — Christopher S McCarthy
(74) *Attorney, Agent, or Firm* — Michael A. Springs; Moore & Van Allen PLLC; James C. Edwards

(57) ABSTRACT

A system for remediating computing-related events by taking into account the past performance of remediation processes and the current run-time environment in which the remedy will be deployed. Robotic Process Automation is implemented to identify computing-related events requiring automation and to record actions that are taken to remediate the events. Robotic scripts (bots) are created based on the recorded actions and are implemented in a learning-mode, in which run-time conditions and level of performance are recorded, such that, run-time conditions and performance are determinative of which bot or combination of bots are implemented for subsequent occurrence of computing-related events. Additionally, remedial process associated with the bot(s) may be executed in a simulated environment prior to the production run-time computing environment to validate the bot and insure the likelihood of effective performance of the remedial process in the run-time production environment.

20 Claims, 4 Drawing Sheets

(56) References Cited

U.S. PATENT DOCUMENTS

| | | |
|---|---|---|
| 7,174,563 B1 | 2/2007 | Brownlie et al. |
| 7,260,844 B1 | 8/2007 | Tidwell et al. |
| 7,383,578 B2 | 6/2008 | Blake et al. |
| 7,680,809 B2 | 3/2010 | Deng et al. |
| 7,752,554 B2 | 7/2010 | Biggs et al. |
| 7,752,664 B1 | 7/2010 | Satish et al. |
| 7,818,615 B2 | 10/2010 | Krajewski, III et al. |
| 7,861,252 B2 | 12/2010 | Uszok et al. |
| 7,937,624 B2 | 5/2011 | Qing et al. |
| 7,966,654 B2 | 6/2011 | Crawford |
| 7,966,655 B2 | 6/2011 | Acharya et al. |
| 7,966,659 B1 | 6/2011 | Wilkinson et al. |
| 8,065,719 B2 | 11/2011 | Yang |
| 8,171,406 B1 | 5/2012 | Newstadt et al. |
| 8,239,674 B2 | 8/2012 | Lee et al. |
| 8,285,652 B2 | 10/2012 | Biggs et al. |
| 8,397,282 B2 | 3/2013 | Turley et al. |
| 8,418,240 B2 | 4/2013 | Wool |
| 8,448,139 B2 | 5/2013 | Ghosh |
| 8,549,643 B1 | 10/2013 | Shou |
| 8,572,733 B1 | 10/2013 | Rockwood |
| 8,588,767 B2 | 11/2013 | Fujimoto et al. |
| 8,793,578 B2 | 7/2014 | Mounty et al. |
| 8,819,825 B2 | 8/2014 | Keromytis et al. |
| 8,935,673 B1 | 1/2015 | Ashkenazi et al. |
| 8,955,743 B1 | 2/2015 | Block et al. |
| 9,021,419 B2 | 4/2015 | Pana et al. |
| 9,105,143 B1 | 8/2015 | Huggins et al. |
| 9,215,213 B2 | 12/2015 | Bansal et al. |
| 9,280,406 B2 | 3/2016 | Ghosh |
| 9,311,632 B1 | 4/2016 | Dent |
| 9,356,942 B1 | 5/2016 | Joffe |
| 9,356,957 B2 | 5/2016 | Keromytis et al. |
| 9,450,901 B1 | 9/2016 | Smullen et al. |
| 9,462,013 B1 | 10/2016 | Boss et al. |
| 9,555,544 B2 | 1/2017 | Bataller et al. |
| 9,600,456 B2 | 3/2017 | Sriganesh et al. |
| 9,641,544 B1 | 5/2017 | Treat et al. |
| 9,647,968 B2 | 5/2017 | Smullen et al. |
| 9,667,596 B2 | 5/2017 | Halabi |
| 9,674,222 B1 | 6/2017 | Joffe |
| 9,817,967 B1 | 11/2017 | Shukla et al. |
| 9,923,908 B2 | 3/2018 | Boss et al. |
| 10,110,629 B1 | 10/2018 | Kruse et al. |
| 10,187,337 B2 | 1/2019 | Smullen et al. |
| 10,324,457 B2 | 6/2019 | Neelakandan et al. |
| 2002/0184528 A1 | 12/2002 | Shevenell et al. |
| 2003/0046583 A1 | 3/2003 | Goldman et al. |
| 2004/0168173 A1 | 8/2004 | Cohen et al. |
| 2005/0044418 A1 | 2/2005 | Miliefsky |
| 2005/0076237 A1 | 4/2005 | Cohen et al. |
| 2005/0166072 A1 | 7/2005 | Converse et al. |
| 2006/0056285 A1 | 3/2006 | Krajewski et al. |
| 2006/0090136 A1 | 4/2006 | Miller et al. |
| 2006/0191010 A1 | 8/2006 | Benjamin |
| 2007/0143847 A1 | 6/2007 | Kraemer et al. |
| 2008/0168425 A1 | 7/2008 | Sen et al. |
| 2010/0223327 A1 | 9/2010 | Srivastava et al. |
| 2011/0131644 A1 | 6/2011 | Keanini et al. |
| 2011/0173496 A1 | 7/2011 | Hosek et al. |
| 2011/0282508 A1 | 11/2011 | Goutard et al. |
| 2012/0215348 A1 | 8/2012 | Skrinde |
| 2013/0227697 A1 | 8/2013 | Zandani |
| 2014/0201571 A1 | 7/2014 | Hosek et al. |
| 2014/0359708 A1 | 12/2014 | Schwartz |
| 2015/0213369 A1 | 7/2015 | Brandt et al. |
| 2016/0006755 A1 | 1/2016 | Donnelly et al. |
| 2016/0048502 A1 | 2/2016 | Montenegro et al. |
| 2016/0134653 A1 | 5/2016 | Vallone et al. |
| 2016/0335016 A1 | 11/2016 | Kurian et al. |
| 2017/0001308 A1 | 1/2017 | Bataller et al. |
| 2017/0052824 A1 | 2/2017 | Sharma et al. |
| 2017/0173784 A1 | 6/2017 | Shah et al. |
| 2017/0177416 A1 | 6/2017 | Altman et al. |
| 2017/0220324 A1 | 8/2017 | Balasubramanian et al. |
| 2017/0249283 A1 | 8/2017 | Gupta et al. |
| 2017/0269972 A1 | 9/2017 | Hosabettu et al. |
| 2017/0270431 A1 | 9/2017 | Hosabettu et al. |
| 2017/0352041 A1* | 12/2017 | Ramamurthy ...... G06F 3/04847 |
| 2017/0364355 A1 | 12/2017 | Nitschke et al. |
| 2018/0160309 A1 | 6/2018 | Turgeman et al. |
| 2018/0197123 A1 | 7/2018 | Parimelazhagan et al. |
| 2018/0285839 A1 | 10/2018 | Yang et al. |
| 2018/0329399 A1 | 11/2018 | Neelakandan et al. |
| 2019/0004932 A1 | 1/2019 | Misra et al. |
| 2019/0089740 A1 | 3/2019 | Hastings |
| 2019/0102676 A1 | 4/2019 | Nazari et al. |
| 2019/0124114 A1 | 4/2019 | Purushothaman |
| 2019/0155225 A1 | 5/2019 | Kothandaraman et al. |
| 2019/0163916 A1 | 5/2019 | Steele et al. |
| 2019/0182289 A1 | 6/2019 | White |
| 2019/0188114 A1* | 6/2019 | Hopper ............... G06F 11/1464 |
| 2019/0347185 A1* | 11/2019 | Moore ..................... G06F 8/60 |

OTHER PUBLICATIONS

Shankar Mahadevan et al., A Network Traffic Generator Model for Fast Network-on-Chip Simulation, Mar. 7-11, 2005, ACM, vol. 2, pp. 780-785. (Year: 2005).

Lee Breslau et al., Advances in Network Simulation, IEEE, Volume: 33, Issue: 5, May 2000, pp. 59-67. (Year: 2000).

J. Burns et al., Automatic Management of Network Security Policy, Aug. 7, 2002, IEEE, pp. 12-26. (Year: 2002).

* cited by examiner

PROCESS AUTOMATION ACTION REPOSITORY AND ASSEMBLER

FIELD OF THE INVENTION

The present invention is generally directed to remediating computing-related events and, more specifically, leveraging the use of multiple Robotic Process Automation (RPAs) modules for a given computing-related event, each RPA module having a different (i) sequence of remediation steps and/or scripts and/or (ii) applicable to specific run-time computing environment parameters, such that implementation of one of the RPA module in addressing a computing-related event takes into account dynamic changes in the computing environment (e.g., time of day/week, network load, network configuration, load-balancing environment, clustered environment and the like).

BACKGROUND

In large computing network environments, such as an enterprise-wide intranet or like, computing-related events, otherwise referred to as issues or problems that require remediation occur constantly on an ongoing basis. For example, services or applications may go "down" (i.e., become inoperable or otherwise inaccessible) or non-fatal errors may occur in a service or application, both of which may require remediation. In many instances, the entity overseeing the environment will have a standard operating procedure (SOP) for resolving the computing-related event. Such a standard operating procedure will typically entail a sequence of steps for remediating/resolving the computing-related event and the steps may involve both manual and automated (i.e., scripts) processes.

However, the remediation/resolution of a specific computing-related event does not remain static over time. Dynamics in the computing environment (e.g., changes in network configuration/hardware, network load and the like) may result in a previous remedy/resolution becoming invalid. In such instances, the standard operating procedure may be revised based on the need to revise the sequence of steps and or revise or change the scripts needed to remediate the computing-related event. Such formal documentation changes to a SOP are usually time consuming and, as the dynamics of the computing environment rapidly change, may be ineffective in terms of remediating the computing-related event even before such changes to the SOP are approved/implemented.

The problem related to dynamic changes in the computing environment is not addressed simply by fully automating the remediation process. Automation (implementing scripts or the like to perform tasks that would otherwise be manual) merely speeds up the remediation process. However, the automated scripts are static in nature (i.e., based on the sequence of steps that were known, at a previous point in time, to remediate/resolve the computing-related event). In this regard, as the dynamics in the computing environment change, the scripts also need to revised, accordingly.

Therefore, a need exists to provide for remediation/resolution of computing-related events that take into account dynamic changes in the computing environment and the current run-time environment in which the remediation/resolution will be implemented. Moreover, a need exists to assess the performance of a remediation/resolution process, such that, previous performance of a resolution may be taken into consideration when determining which remediation/resolution should be implemented for a current event. In addition, a need exists to insure that a remediation/resolution process being considered for deployment will be an effective remedy/resolution prior to actual deployment in the computing environment.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods directed to remediating computing-related events (i.e., behaviors that occur in the computing environment that are deviations from a normal or baseline state) by taking into account the past performance of remediation processes and the current run-time environment in which the remedy will be deployed. As such the present invention insures that changes that occur in the computing environment, over time, are accounted for in determining which remediation process should be deployed.

Specifically, according to embodiments of the invention Robotic Process Automation (RPA) is implemented to identify/determine occurrences of computing-related events, i.e., when a behavior is observed that deviates from a normal or baseline state. For example, a service or application is deemed to be "down", an error is occurring in a service or application or the like.

In response to identifying the occurrence of a computing-related event, the actions performed to remediate the computing-related events are recorded. The actions may be manual actions conducted by an associate/engineer in remedying the event (e.g., specific computer actions/keystrokes and the like) and/or automated actions (e.g., execution of one or more scripts that perform specific remedial actions). In response to recording the actions, a robotic script (bot) is created that defines a remediation process for the computing-related event based on the recorded actions. The bot is configured to be implemented in a learning mode, such that, in response, to implementing the bot (i.e., the recorded actions) as the remediation process for current computing-related event or any future computing-related events, the bot records (i.e., learns) the parameters of the run-time production computing environment in which the event occurred and/or will be deployed and the level of performance in run-time production computing environment resulting from implementing the bot as the remediation process. In this regard, the bot is capable of knowing that for an event that occurred under, or will be deployed in, specific computing environment parameters conditions (e.g., time of day, load, configuration, and the like) this is the level of performance that results from remedying the event using the recorded actions (i.e., specific set of steps/actions).

In specific embodiments of the invention, once subsequent computing-related events occur, determinations may be made as to whether a bot should be created or whether one or more of existing bots should be implemented to remedy the computing-related event. If a determination is made that none of the pre-existing bots are capable of adequately remedying the event, a new bot may be created. If a determination is made that one or more preexisting bots are capable of adequately remedying the event, a determination is made as to which of the preexisting bots should be implemented. Such a determination is made based on one or more of the (i) nature of the event, (ii) the parameters (time of day/week, load, configuration) in the computing environment under which the event occurred and/or under which the remedy will be deployed, (iii) parameters of a run-time production computing environment in which previously created bots were previously deployed, and (iv) performance of previous remediation processes in which previously created bots were previously deployed.

In specific embodiments of the invention, determination of which bots to implement for a computing-related event includes which combination of two or more bots should be implemented to remedy the computing-related events. In the event that two or more bots are combined to remedy a computing-related events, the combination of bots results in generating a new bot (comprising the combination of bots) which is configured to be implemented in the aforementioned learning mode and can be considered and implemented for remedying subsequent similar computing-related events.

In other embodiments of the invention, as part of the bot determination process, the bots are executed in a simulated environment that replicates the conditions in the run-time production computing environment prior to implementing a bot to remedy a computing-related event. Such simulation not only insures that the bot will remedy the computing0related event but also provides an indication as the level of performance that will be achieved in the run-time production computing environment as a result of implementing the bot.

The following provides a brief summary of claimed embodiments on the invention. This summary should be construed as limiting the embodiments of the invention, in that, other embodiments of the invention are herein considered which have not been claimed in the time of filing this application.

A system for remediating computing-related events defines first embodiments of the invention. The system comprises a computing platform (i.e., one and typically more computing devices) having a memory and at least one processor in communication with the memory. The system includes a first robotic process automation (RPA) module that is stored in the memory and executable by the at least one processor. The first RPA module is configured to monitor a computing environment to detect occurrences of a computing-related event. A computing-related event, as used herein, is a behavior occurring within the computing environment that deviates from a normal state.

The system additionally includes a second RPA module that is stored in the memory and executable by the at least one processor. In specific embodiments of the invention the first and second RPA modules are embodiments as one singular RPA module. The second RPS module is configured to, in response to receiving notification, from the first RPA module, of each occurrence of the computing-related event, (i) record actions performed to remediate the computing-related event, e.g., manual actions/user inputs and/or execution of script(s) and (ii) create a robotic script (bot) that (a) defines a remediation process for remediating the computing-related event based on the recorded actions and (b) records (i) parameters of a run-time production computing environment in which the remediation process is deployed, and (ii) a level of performance of the remediation process in the computing environment. In this regard, the bot that is created is in learning-mode, in that, each time that it is implemented to remediate a computing-related event, the parameters (e.g., time/date, network configuration, load, and the like) of the run-time production environment and the level of performance exhibited by the run-time production environment are recorded.

In specific embodiments the system further includes a bot determining module that is stored in the memory and executable by the at least one processor. The bot determining module is configured to, in response to creating a plurality of bots and receiving notification, from the first RPA module, of an occurrence of the computing-related event, determine which of the plurality of bots to deploy as a remediation process for the computing-related event. The determination of which bots to deploy may be based on one or more of (a) the computing-related event, (b) parameters of a run-time production computing environment in which the computing-related event occurred or a remediation process is to be deployed, (c) parameters of a run-time production computing environment in which the plurality of bots were previously deployed, and (d) performance of previous remediation processes in which the plurality of bots were previously deployed. In such embodiments of the system, determining which of the bots to deploy may include determining a combination of two or more the plurality of bots to deploy as the remediation process for the computing-related event. In such embodiments, in which a combination of bots is deployed, the second RPA module is further configured to create a robotic script (bot) for the combination of the two or more bots that defines a remediation process for remediating the computing-related event. The resulting bot is placed into learning mode, such that, each time that it is implemented to remediate a computing-related event, the parameters of the run-time production environment and the level of performance exhibited by the run-time production environment are recorded.

In further specific embodiments the system includes a bot determining module that is stored in the memory and executable by the at least one processor. The bot determining module is configured to, in response to receiving notification, from the first RPA module, of an occurrence of the computing-related event, determine to (i) implement the second RPA module to create a bot for remediating the computing-related event, or (ii) implement one or more of a plurality bots to remediate the computing-related event. In such embodiments the determination may be based on at least one of (a) the computing-related event, (b) parameters of a run-time production computing environment in which the computing-related event occurred or a remediation process is to be deployed, (c) parameters of a run-time production computing environment in which the plurality of bots were previously deployed, and (d) performance of previous remediation processes in which the plurality of bots were previously deployed.

In other embodiments the system includes a bot simulation module stored in the memory, executable by the at least processor and configured to, prior to deploying the bot as remediation for a computing-related event (i) execute the bot in a simulated environment having substantially same parameters as the run-time production computing environment, (ii) determine a likely acceptable level of performance for the bot in the run-time production computing environment based on a performance of the bot in the simulated environment, and (iii) in response to determining the likely acceptable level of performance, authorize the bot for remediating the computing-related event. In other embodiments of the invention, the bot simulation module is configured to, prior to deploying one or more bots as remediation for a computing-related event, execute the one or more bots in a simulated environment having substantially same parameters as the run-time production computing environment. In such embodiments of the system, the bot determining module is further configured to determine which of the one or more previously created bots to deploy as the remediation process, based on executing the one or more bots previously created bots in the simulated environment.

In still further specific embodiments the system includes a remediation performance evaluating module that is stored in the memory and executable by the at least one processor and configured to, in response to deploying the bot as a remediation process for a computing-related event, determine performance of the remediation process in a run-time production computing environment.

A computer processor-implemented method for remediating computing-related events defines second embodiments of the invention. The method includes monitoring, by a robotic process automation (RPA) computing module, a computing environment to detect occurrences of a computing-related event. The computing-related event, as defined herein, is a behavior occurring within the computing environment that deviates from a normal state. The method further includes, in response to receiving notification of each occurrence of the computing-related event, recording, by a RPA computing module, actions performed to remediate the computing-related event. In addition, the method includes creating, by a RPA computing module, a robotic script (bot) that (a) defines a remediation process for remediating the computing-related event based on the recorded actions and (b) records (i) parameters of a run-time production computing environment in which the remediation process is deployed, and (ii) a level of performance of the remediation process in the computing environment.

In specific embodiments the method further includes in response to creating a plurality of bots and receiving notification of an occurrence of a computing-related event, determining, by a computing device processor, which of the plurality of bots to deploy as the remediation process. In such embodiments of the method, the determination may be based on at least one of (a) the computing-related event, (b) parameters of a run-time production computing environment in which the computing-related event occurred or a remediation process is to be deployed, (c) parameters of a run-time production computing environment in which the plurality of bots were previously deployed, and (d) performance of previous remediation processes in which the plurality of bots were previously deployed. In related embodiments of the method, determining which of the plurality of bots to deploy as the remediation process may include determining a combination of two or more the plurality of bots to deploy as the remediation process for the computing-related event and creating a bot comprising the two or more bots.

A computer program product including a non-transitory computer-readable medium defines third embodiments of the invention. The computer-readable medium includes codes for causing a computing device processor to monitor, by robotic process automation (RPA), a computing environment to detect occurrences of a computing-related event. The computing-related event, as defined herein, is a behavior occurring within the computing environment that deviates from a normal state. The codes further cause a computer device processor to, in response to receiving notification of each occurrence of the computing-related event, record, by RPA, actions performed to remediate the computing-related event. In addition, the codes further cause the computer device processor to, create, by RPA, a robotic script (bot) that defines a remediation process for remediating the computing-related event based on the recorded actions and records (i) parameters of a run-time production computing environment in which the remediation process is deployed, and (ii) a level of performance of the remediation process in the computing environment.

In specific embodiments of the computer program product, the computer-readable medium further includes codes for causing a computing device processor to, in response to creating a plurality of bots and receiving notification of an occurrence of a computing-related event, determine which of the plurality of bots to deploy as the remediation process.

Thus, according to embodiments of the invention, which will be discussed in greater detail below, the present invention provides for remediating computing-related events by taking into account the past performance of remediation processes and the run-time environment in which the event occurred and/or the remedy will be deployed. Robotic Process Automation is implemented to identify computing-related events requiring automation and to record actions that are taken to remediate the events. Robotic scripts (bots) are created based on the recorded actions and are implemented in a learning-mode, in which run-time conditions and level of performance are recorded, such that, run-time conditions and performance are determinative of which bot or combination of bots are implemented for subsequent occurrence of computing-related events. Additionally, remedial process associated with the bot(s) may be executed in a simulated environment prior to the production run-time computing environment to validate the bot and insure the likelihood of effective performance of the remedial process in the run-time production environment.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
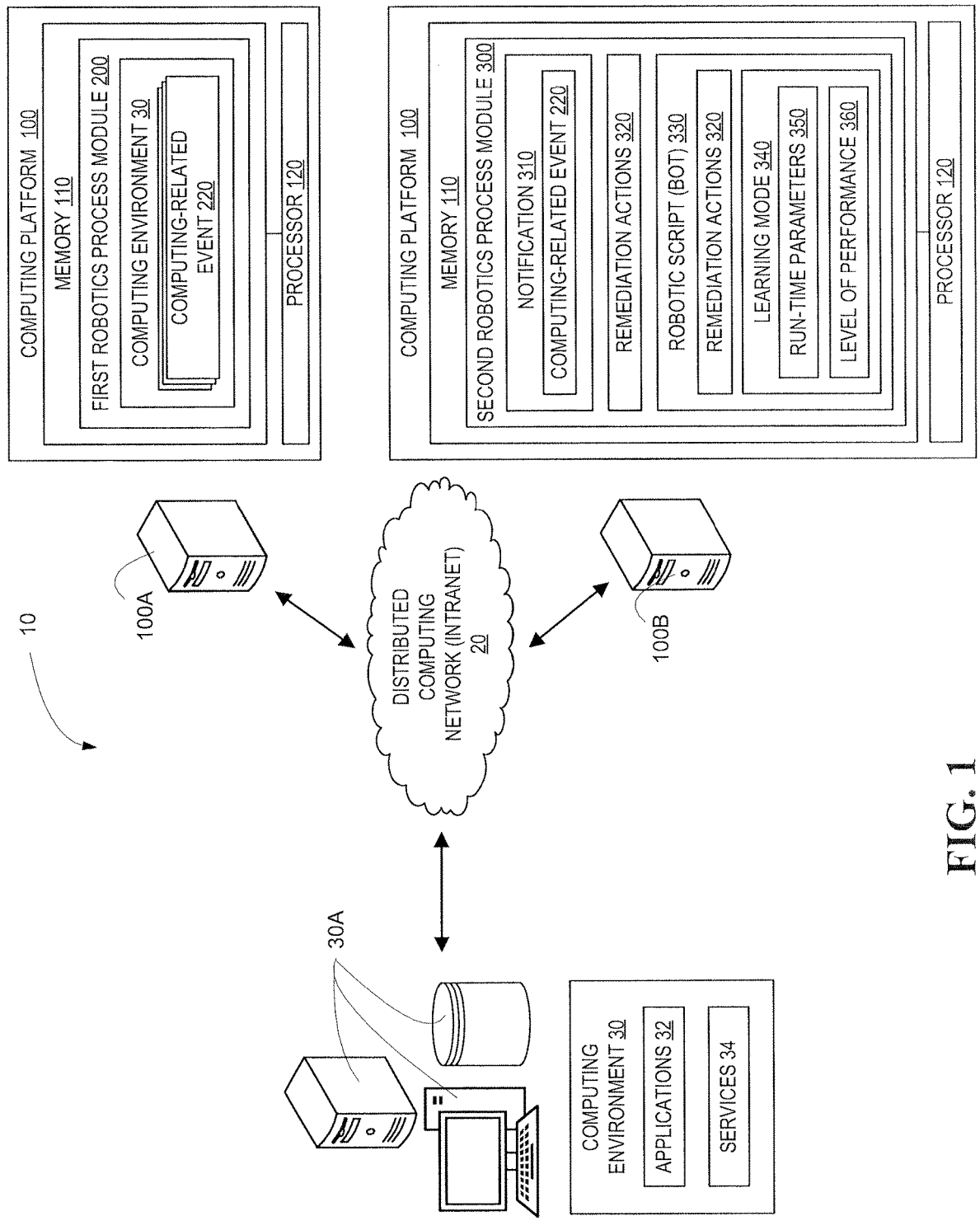
Figure 2:
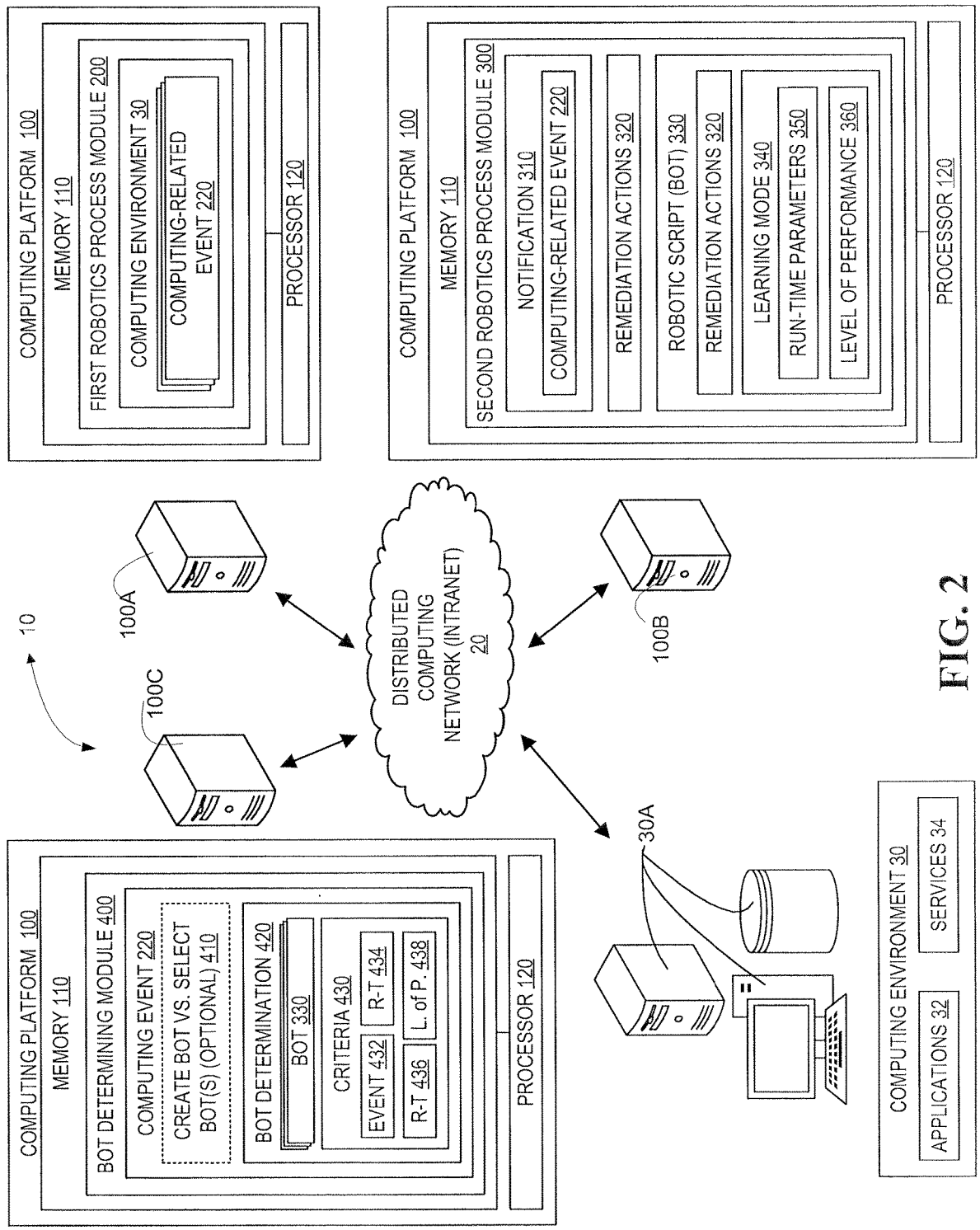
Figure 3:
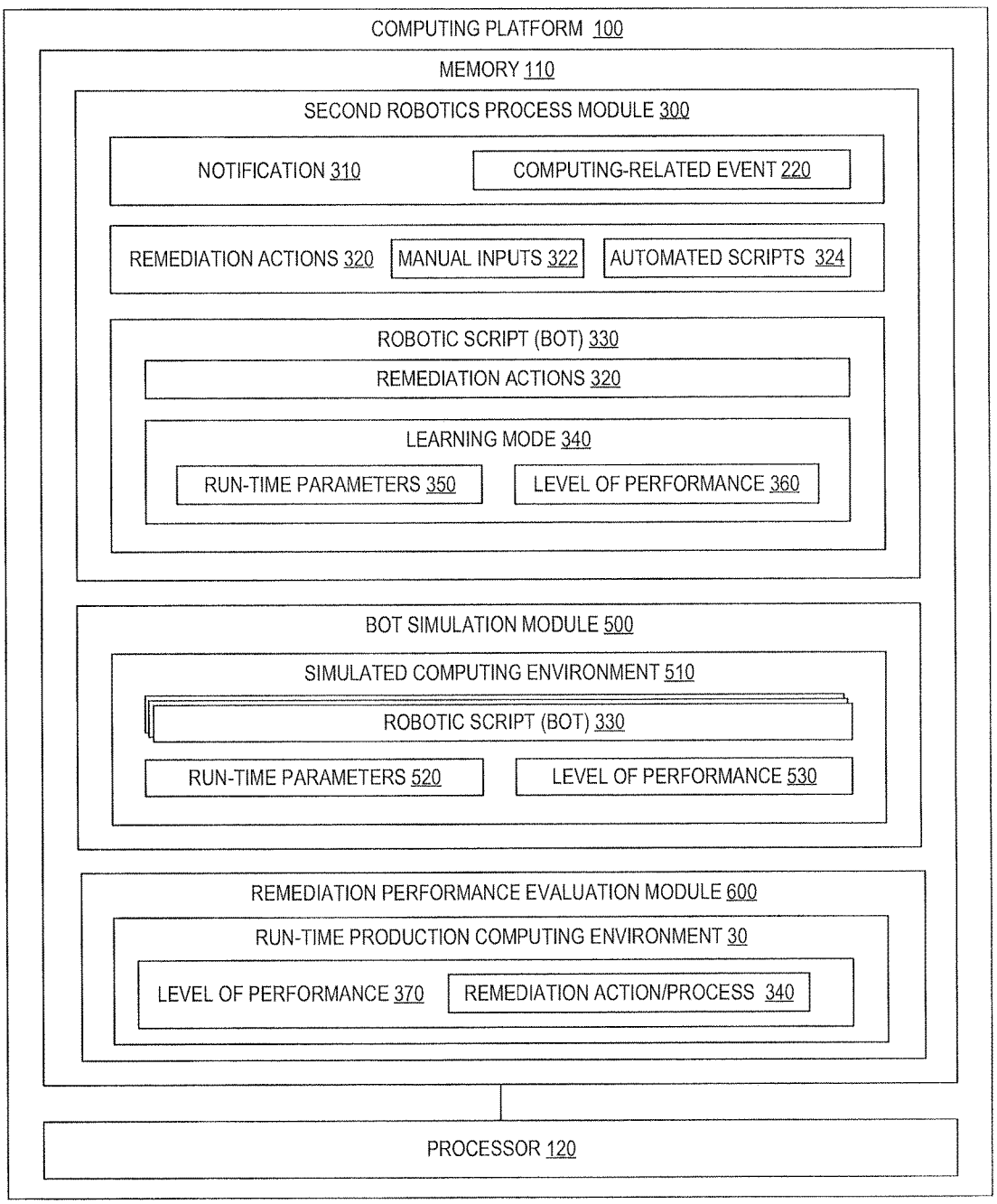
Figure 4:
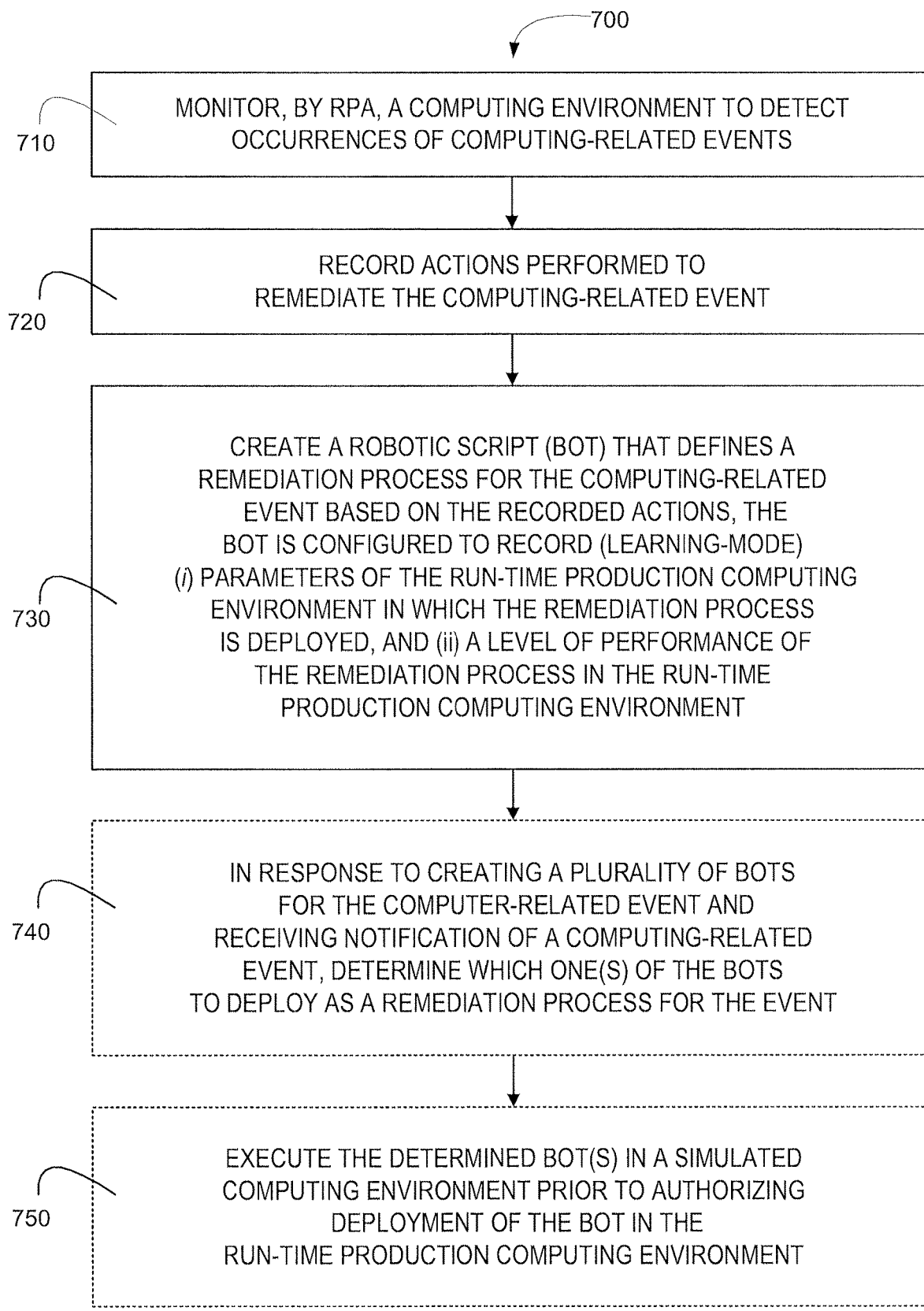

Having thus described embodiments of the invention in general terms, reference will now be made the accompanying drawings, wherein:

FIG. 1 provides a schematic diagram of a system for remediating computing-related event through implementation of Robotic Process Automation (RPA), in accordance with embodiments of the invention;

FIG. 2 provides a more detailed schematic diagram of a system for remediating computing-related event through implementation of Robotic Process Automation (RPA), in accordance with alternate embodiments of the invention;

FIG. 3 provides a block diagram of an computing platform for remediating computing-related event through implementation of Robotic Process Automation (RPA), in accordance with embodiments of the invention; and FIG. 4 provides a flow diagram of a method for remediating computing-related event through implementation of Robotic Process Automation (RPA), in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, systems, methods and the like are provided for remediating computing-related events (i.e., behaviors that occur in the computing environment that are deviations from a normal or baseline state). The remediation process is dynamic, in that, it takes into account the past performance of previous similar remediation processes and the current run-time environment in which the remedy will be deployed. As such the present invention insures that changes that occur in the computing environment, over time, are accounted for in determining which remediation process will be the most effective in deployment.

Specifically, according to embodiments of the invention Robotic Process Automation (RPA) is implemented to identify/determine occurrences of computing-related events, i.e., when a behavior is observed that deviates from a normal or baseline state. For example, a service or application is deemed to be "down", an error is occurring in a service or application or the like.

In response to identifying the occurrence of a computing-related event, the actions performed to remediate the computing-related events are recorded. The actions may be manual actions conducted by an associate/engineer in remedying the event (e.g., specific computer actions/keystrokes and the like) and/or automated actions (e.g., execution of one or more scripts that perform specific remedial actions). In response to recording the actions, a robotic script (bot) is created that defines a remediation process for the computing-related event based on the recorded actions. The bot is configured to be implemented in a learning mode, such that, in response, to implementing the bot (i.e., the recorded actions) as the remediation process for current computing-related event or any future computing-related events, the bot records (i.e., learns) the parameters of the run-time production computing environment in which the event occurred and/or will be deployed and the level of performance in run-time production computing environment resulting from implementing the bot as the remediation process. In this regard, the bot is capable of knowing that for an event that occurred under, or will be deployed in, specific computing environment parameters conditions (e.g., time of day, load, configuration, and the like) this is the level of performance that results from remedying the event using the recorded actions (i.e., specific set of steps/actions).

In specific embodiments of the invention, once subsequent computing-related events occur, determinations may be made as to whether a bot should be created or whether one or more of existing bots should be implemented to remedy the computing-related event. If a determination is made that none of the pre-existing bots are capable of adequately remedying the event, a new bot may be created. If a determination is made that one or more preexisting bots are capable of adequately remedying the event, a determination is made as to which of the preexisting bots should be implemented. Such a determination is made based on one or more of the (i) nature of the event, (ii) the parameters (time of day/week, load, configuration) in the computing environment under which the event occurred and/or under which the remedy will be deployed, (iii) parameters of a run-time production computing environment in which previously created bots were previously deployed, and (iv) performance of previous remediation processes in which previously created bots were previously deployed.

In specific embodiments of the invention, determination of which bots to implement for a computing-related event includes which combination of two or more bots should be implemented to remedy the computing-related events. In the event that two or more bots are combined to remedy a computing-related events, the combination of bots results in generating a new bot (comprising the combination of bots) which is configured to be implemented in the aforementioned learning mode and can be considered and implemented for remedying subsequent similar computing-related events.

In other embodiments of the invention, as part of the bot determination process, the bots are executed in a simulated environment that replicates the conditions in the run-time production computing environment prior to implementing a bot to remedy a computing-related event. Such simulation not only insures that the bot will remedy the computing0related event but also provides an indication as the level of performance that will be achieved in the run-time production computing environment as a result of implementing the bot.

Referring to FIG. 1 a schematic diagram is shown of a system 10 for remediating computing-related events, in accordance with embodiments of the invention. As previously discussed, a computing-related event, as used herein, is the occurrence of anomaly in a computing environment (i.e., a deviation from a baseline or normal state). The system 10 is implemented in a distributed computing network 20, which allows for computerized communication of data between different computing platforms, apparatus, devices and the like. The distributed computing network 20 may one or more intranets (e.g., enterprise-specific computing network) or the like. The distributed computing network 20 includes a computing environment 30 that includes various hardware components 30A (e.g., servers, storage devices, personal computing devices and the like).

The system 100 includes a computing platform 100 that is in network communication with the computing environment 30 via distributed computing network 20. Computing platform 100 includes a memory 110 that is in communication with one or more processors 120. Computing platform 100 may be included within one or more devices, for example, in FIG. 1, computing platform 100 is included in servers 100A and 100B; however, in other embodiments of the invention computing platform 100 is included in less or more computing devices.

Memory 110 of computing platform 100 stored first robotics process automation (RPA) module 200 that is executable by processor 120 and is configured to monitor the computing environment 30 to detect occurrence of computing-related events 220. A computing-related event, as defined herein, is the occurrence of an event that deviates from a known baseline or "normal" state. In this regard, the entity operating the system 100, may define the baseline or "normal" state and may define the extent (i.e., threshold or the like) of a deviation from the baseline/"normal" state that constitutes an event (i.e., what event requires remediation by the entity). As previously discussed, an application or service determined to be inactive/"down", an error (or a threshold level of errors) occurring within an application/service or the like may constitute an event.

Memory 110, of computing platform 300 additionally stores second robotic process automation (RPA) module 300 that is executable by processor 120. While first and second RPA modules 200, 300 are discussed herein as separate entities, without departing from the inventive spirit herein described, the functionality of first and second RPA modules 200, 300 may be included in one singular module or more than two modules. Second RPA module is configured, in response to receiving notification 310 of a computing-related event 220, record remediation actions 320 taken to remedy the computing-related event 220. The remediation actions 320 may be specific steps taken by an analyst/specialist to resolve/remedy the computing-related event 220. The specific steps may include a sequence of keystrokes that the analyst/specialist performed to resolve/remedy. The remediation actions 320 may include implementation of one or more automated scripts, alone or in conjunction with actions taken by an analyst/specialist.

In response to recording the remediation actions 320, second RPA module is configured to create a robotic script (bot) 330 that defines a remediation process for remediating the computing-related event 220 based on the recorded remediation actions 320. In this regard, the bot 330 may be executed to perform the recorded remediation actions 320 when subsequent occurrences of the same or similar computing-related event 220 occurs. The bot 330 is further configured to record (i.e., executed in learning mode 340), when executed, the parameters 350 of the run-time production computing environment 30 in which it is deployed and the level of performance 360 of the remediation process in the computing environment 30. Parameters 350 of the run-time production computing environment 30 may include but are not limited to, time/date of deployment, network load, network configuration, including hardware and software implemented/executed, load balancing and the like. The level of performance 360 of the level of performance 360 of the remediation process may be any statistic/indicator that provides an indication of how the remediation process is performing. For example, the efficiency/rate of the application/service post-remediation, throughput of the application/service post-remediation or the like. As will be discussed infra., parameters 350 and level of performance 360 may be subsequently used as determinative factors in determining if a bot should be deployed to remedy a subsequent occurrence of a same or similar computing-related event 220 and/or which bot(s) should be deployed to remedy a subsequent occurrence of a same or similar computing-related event 220.

Referring to FIG. 2, a schematic diagram is shown of a system 10 for remediating computing-related events, in accordance with embodiments of the invention. The system 10 of FIG. 2 provides for alternative embodiments of the invention that were not shown and described in reference to FIG. 1. As shown in FIG. 2 the computer platform 100 is included in three separate networked devices 100A, 100B and 100C, such as servers or the like. However, in other embodiments of the invention more or less network devices may comprise the computing platform 100.

In the system 10 of FIG. 2 the memory 110 of computing platform 100 stores bot determining module 400 that is executable by the one or more processors 120 and configured to, in response to notification of a computing-related event 220, determine 420 which one(s) of the previously created bots 330 to deploy to remedy the computing-related event 220. In optional embodiments of the system 10, prior to determining which one(s) of the previously created bots to deploy, a determination may be made as to whether to create a bot or determine/select bot(s) from amongst the previously created bots 330. In certain instance, a bot may not have been created for the specific computing-related event 220, or the bot(s) that have been created are either outdated, are not applicable to the parameters/conditions existing in the run-time production computing environment and/or are not likely to provide an acceptable level of performance in the run-time computing environment. In such instance, it is necessary to create a bot 330 (i.e., as previously discussed, record remediation actions 320 taken to remedy the computing-related event 220) as opposed to determining which bot(s) to deploy.

Determination 420 of which bot(s) to deploy (and, in optional embodiments, whether to create a bot or deploy bot(s)) may be based on criteria 430 comprising one or more, in some embodiments all of, (i) the type or specifics of the computing-related event 432, (ii) parameters 434 of the run-time computing environment in which the computing-related event occurred and/or parameters of the run-time computing environment in which the remediation process will be deployed, (iii) parameters 436 of the run-time computing environment in which bots were previously deployed, and/or (iv) level of performance 438 of the bots during previous runt-time computing environment deployment.

In specific embodiments of the invention, determination 420 of which bot(s) 330 deploy as the remediation process includes determining that two or more (i.e., a combination) of bots 330 are to be deployed based on the any of the criteria 430 listed above and, in particular, the type or specifics of the computing-related event 432. In such instances, in which two or more bots 330 are deployed in combination as the remediation process, the second RPA module 300 may be implemented to create a new bot 330 (i.e., a bot that includes the combination of the two or more bots 330). The new bot is created so that it may be considered for deployment when a same or similar computing-related event 220 occurs and, so that, the parameters 350 of the run-time production computing environment 30 to which it is deployed and the level of performance 340 in the run-time computing environment can be recorded.

Referring to FIG. 3 a block diagram is provided of computing platform 100, in accordance with specific embodiments of the invention. In addition to providing more details, FIG. 3 provides various optional embodiments of the system. The computing platform 100, which, as previously discussed, may comprise one or more apparatus, devices is configured to execute algorithms, such as modules, routines, applications and the like. Computing platform 100 includes memory 110, which may comprise volatile and non-volatile memory, such as read-only and/or random-access memory (RAM and ROM), EPROM, EEPROM, flash cards, or any memory common to computer platforms). Moreover, memory 100 may comprise cloud storage, such as provided by a cloud storage service and/or a cloud connection service.

Further, computing platform 100 also includes processor 120, which may be an application-specific integrated circuit ("ASIC"), or other chipset, logic circuit, or other data processing device. Processor 120 may execute an application programming interface ("API") (not shown in FIG. 3) that interfaces with any resident programs, such as first and second RPA modules 200, 300, bot determining module 400, bot simulation module 500, remediation performance evaluation module 600 or the like stored in the memory 110 of the computing platform 110.

Processor 120 may include various processing subsystems (not shown in FIG. 3) embodied in hardware, firmware, software, and combinations thereof, that enable the functionality of the computing platform 100 and the operability of the computing platform 100 on the distributed computing network 20 (shown in FIG. 1). For example, processing subsystems allow for initiating and maintaining communications and exchanging data with other networked devices. For the disclosed aspects, processing subsystems of processor 120 may include any subsystem used in conjunction with first and second RPA modules 200, 300, bot determining module 400, bot simulation module 500, remediation performance evaluation module 600 and related sub-routines, algorithms, sub-algorithms, modules, sub-modules thereof.

Computer platform 100 may additionally include a communications module (not shown in FIG. 3) embodied in hardware, firmware, software, and combinations thereof, that enables electronic communications between the computing platform 100 and other platforms, apparatus and/or devices (shown in FIGS. 1 and 2). Thus, communication module may include the requisite hardware, firmware, software and/or combinations thereof for establishing and maintaining a network communication connection.

As previously discussed in relation to FIG. 1, memory 110 of computing platform 100 stores second robotic process automation (RPA) module 300 that is executable by processor 120. Second RPA module is configured, in response to receiving notification 310 of a computing-related event 220, record remediation actions 320 taken to remedy the computing-related event 220. The remediation actions 320 may be specific steps taken by an analyst/specialist to resolve/remedy the computing-related event 220. The specific steps may include manual inputs 322 (i.e., sequence of keystrokes that the analyst/specialist performs to resolve/remedy). Additionally, the remediation actions 320 may include implementation of one or more automated scripts 324, alone or in conjunction with manual inputs 322 received from the analyst/specialist.

In response to recording the remediation actions 320, second RPA module is configured to create a robotic script (bot) 330 that defines a remediation process for remediating the computing-related event 220 based on the recorded remediation actions 320. In this regard, the bot 330 may be executed to perform the recorded remediation actions 320 when subsequent occurrences of the same or similar computing-related event 220 occurs. The bot 330 is further configured to record (i.e., executed in learning mode 340), when executed, the parameters 350 of the run-time production computing environment 30 in which it is deployed and the level of performance 360 of the remediation process in the computing environment 30. Parameters 350 of the run-time production computing environment 30 may include but are not limited to, time/date of deployment, network load, network configuration, including hardware and software implemented/executed, load balancing and the like. The level of performance 360 of the level of performance 360 of the remediation process may be any statistic/indicator that provides an indication of how the remediation process is performing. For example, the efficiency/rate of the application/service post-remediation, throughput of the application/service post-remediation or the like. As will be discussed infra., parameters 350 and level of performance 360 may be subsequently used as determinative factors in determining if a bot should be deployed to remedy a subsequent occurrence of a same or similar computing-related event 220 and/or which bot(s) should be deployed to remedy a subsequent occurrence of a same or similar computing-related event 220.

Memory 110 of computing platform 100 additionally includes bot simulation module 500 that is configured to execute the bots 330 in a simulated computing environment 510 prior to actual deployment of the bot(s) in the runt-time production computing environment 30. The simulated computing environment 510 is configured to have parameters/conditions 520 that are the same or similar to the parameters/conditions in the run-time production environment in which the bot(s) 330 will be deployed. In addition, the bot simulation module 500 is configured to, based on executing the bots 330 in the simulated computing environment 510, determine a likely acceptable level of performance 530 for the bot(s) 330 in the run-time production computing environment 30. In specific embodiments of the invention, the acceptable level of performance 530 may be a predetermined threshold level of performance that the bot(s) are required to meet. In response to determining the likely acceptable level of performance for the bot(s) in the in the run-time production computing environment 30, the module 500 is further configured to authorize the bot(s) for deployment in the run-time production computing environment 30.

In specific embodiments of the invention, the bot simulation module 500 is implemented after the bot(s) have been determined by the bot determining module 400. In such embodiments of the invention, if the determined bot(s) are found by the bot simulation module 500 to have an unacceptable likely level of performance 530, the bot determining module 400 may determine one or more different bot(s) and/or the second RPA module 300 may be invoked to create a new bot 330 based on new remediation actions 320 being taken (i.e., new manual inputs and automated scripts to remedy the computing-related event 220). In other embodiments of the invention, the bot simulation module 500 is implemented in conjunction with the bot determining module 400 as a means for determining which bot(s) 330 to deploy. For example, the bot determining module 400 may apply criteria 430 to determine a plurality of bots 330 that meet or exceed predetermined criteria thresholds and the plurality of bots 330 may then be executed in the simulated computing environment 510 to identify which of the bot(s) provide the highest likely level of performance 530 in the run-time production computing environment 30.

Additionally, memory 110 of computing platform 100 includes remediation performance evaluation module 600 that is configured to evaluate the remediation process 340 (i.e., deployment of one or more bots 330) in the run-time production computing environment 30 to determine the level of performance 370. The level of performance 370 may defined by one or more performance statistics/indicators that that provide an indication of how the remediation process is performing in the production computing environment 30. For example, the efficiency/rate of the application/service post-remediation, throughput of the application/service post-remediation or the like may be included in the level of performance 370. As previously discussed, the level of performance 370 may subsequently be used as criteria 430 in the determination 420 of which of the bot(s) 330 to deploy.

Referring to FIG. 4, a flow diagram is presented of a method 700 for remediating computing-related events, in accordance with embodiments of the invention. At Event 710, Robotics Process Automation (RPA) is implement to monitor a computing environment to detect occurrences of computing-related events. A computing-related event, as defined herein, is a behavior occurring within the computing environment that deviates from a baseline or "normal" state. Thus, the event may be an inactive/down service or application, errors occurring an application, service or the like. In specific embodiments of the invention, an event that results in remediation processing may be predefined by the entity in control (i.e., a specified level of deviation from the baseline/normal state).

At Event 720, in response to receiving notification of an occurrence of a computing-related event, the remediation actions performed to remediate the computing-related events are recorded. As previously discussed, such actions may be automated actions (automatically executing a script or the like) and/or manual actions/inputs (individual keystrokes/entries or the like) by an analyst/specialist assigned to remedy the computing-related event.

At Event 730, a robotic script (bot) is created that defines a remediation process for the computing-related event based on the recorded actions. In this regard, the bot is configured to execute the recorded actions to remediate the computing-related event. In addition, the bot is configured to be executed in a learning mode, whereby, the bot records at least (i) parameters/conditions in the run-time production computing environment in which the bot is deployed (i.e., in which the remediation process occurs), and (ii) a level of performance (i.e., statistics or other indicators of the success or lack thereof of the remediation process) of the remediation process in the run-time production computing environment. As previously discussed, the data that is recorded in the learning mode is subsequently used when determining whether to deploy the bot for remediation of an occurrence of a same or similar computing-related event.

At optional Event 740, in response to creating a plurality of bots (i.e., a library or catalog of bots) and receiving notification of an occurrence of a computing-related event, a determination is made as to which bot(s) are to be deployed as a remediation process for the computing-related event. As previously discussed, the determination of which bot(s) to be deployed may, in further optional embodiments, be precipitated by a determination of whether to create a bot or deploy a bot(s). The determination as to which bots to deploy may be based on criteria including one or more of (i) the type or specifics of the computing-related event, (ii) parameters of the run-time computing environment in which the computing-related event occurred and/or parameters of the run-time computing environment in which the remediation process will be deployed, (iii) parameters of the run-time computing environment in which bots were previously deployed, and/or (iv) level of performance of the bots during previous runt-time computing environment deployment. In specific embodiments of the method, determine of which bot(s) to deploy results in a determination of deploying two or more bots in combination to remediate the computing-related event. In such embodiments of the method, in which two or more bots are deployed, the combination of bots may be used to create a new bot (comprising the combination of bots) so that the new bot may be subsequently considered for deployment in future similar/same computing-related events, as well as, recording of the (i) parameters/conditions in the run-time production computing environment in which the bot is deployed and (ii) the level of performance of the remediation process in the run-time production computing environment.

At optional Event 750, in response to receiving notification of a computing-related event and/or determining which bot(s) to deploy, the bot(s) are executed in a simulated environment having parameters/conditions that are similar/same as the run-time production computing environment. The execution of the bot(s) in the simulated computing environment provide for a likely acceptable level of performance of the bot(s) in the run-time production computing environment. In specific embodiments of the invention, the simulation must indicate a likely acceptable level of performance (i.e., threshold level or the like) in order for the bot(s) to authorized for deployment in the run-time computing environment.

Thus, as described above, embodiments of the present invention provides for provides for implementing robotic process automation (RPA) to enhance computer network security. Specifically, RPA is implemented to detect an unauthorized attempt to access a dataset and, in response, the unauthorized entity is provided access to a bot-generated modified dataset that includes modified data elements that are reasonable facsimiles of the actual data elements and do not expose confidential data. Once access to the modified data set is provided, RPA is used to track actions by the unauthorized entity accessing the modified data set and, once copied, RPA is implemented to track usage of the data by the unauthorized entity. Additionally, RPA is implemented to mitigate damages caused by attempts or actual accessing of the actual datasets by performing actions that prevent further damages, such as deactivating/activating resource storage and authorizing previously configured resource events.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for remediating computing-related events, the system comprising:
a computing platform including a memory and at least one processor in communication with the first memory;
a first robotic process automation (RPA) module stored in the memory, executable by the at least one processor and configured to monitor a computing environment to detect occurrences of a computing-related event, wherein the computing-related event is a behavior occurring within the computing environment that deviates from a normal state;
a second RPA module stored in the memory, executable by the at least one processor and configured to, in response to receiving notification, from the first RPA module, of each occurrence of the computing-related event:
record actions performed to remediate the computing-related event, and
create a robotic script (bot) that defines a remediation process for remediating the computing-related event based on the recorded actions and records (i) parameters of a run-time production computing environment in which the remediation process is deployed, and (ii) a level of performance of the remediation process in the computing environment.

2. The system of claim 1, further comprising:
a bot determining module stored in the memory, executable by the at least one processor and configured to, in response to creating a plurality of bots and receiving notification, from the first RPA module, of an occurrence of the computing-related event, determine which of the plurality of bots to deploy as a remediation process for the computing-related event.

3. The system of claim 2, wherein the bot determining module is further configured in response to determining to creating a plurality of bots and receiving notification, from the first RPA module, determine a combination of two or more the plurality of bots to deploy as the remediation process for the computing-related event.

4. The system of claim 3, wherein the second RPA module is further configured to create a robotic script (bot) for the combination of the two or more of the plurality of bots that defines a remediation process for remediating the computing-related event.

5. The system of claim 2, further comprising:
a bot simulation module stored in the memory, executable by the at least processor and configured to, prior to deploying one or more bots as remediation for a computing-related event, execute the one or more bots in a simulated environment having substantially same parameters as the run-time production computing environment, and
wherein the bot determining module is further configured to determine which of the one or more previously created bots to deploy as the remediation process, based on executing the one or more bots previously created bots in the simulated environment.

6. The system of claim 1, wherein the bot determining module is further configured to determine which of the plurality of bots to deploy as the remediation process for the computing-related event based at least one or more of (a) the computing-related event, (b) parameters of a run-time production computing environment in which the computing-related event occurred or a remediation process is to be deployed, (c) parameters of a run-time production computing environment in which the plurality of bots were previously deployed, and (d) performance of previous remediation processes in which the plurality of bots were previously deployed.

7. The system of claim 1, further comprising:
a bot determining module stored in the memory, executable by the at least one processor and configured to, in response to receiving notification, from the first RPA module, of an occurrence of the computing-related event:

determine to (i) implement the second RPA module to create a bot for remediating the computing-related event, or (ii) implement one or more of a plurality bots to remediate the computing-related event.

8. The system of claim 7, wherein the bot determining modules is further configured to determine to (i) or (ii) is based on at least one of (a) the computing-related event, (b) parameters of a run-time production computing environment in which the computing-related event occurred or a remediation process is to be deployed, (c) parameters of a run-time production computing environment in which the plurality of bots were previously deployed, and (d) performance of previous remediation processes in which the plurality of bots were previously deployed.

9. The system of claim 7, wherein the bot determining module is further configured in response to determining to implement one or more previously created bots to remediate the computing-related event, determine which of the plurality of bots to deploy as the remediation process.

10. The system of claim 7, wherein the bot determining module is further configured in response to determining to implement one or more previously created bots to remediate the computing-related event, determine a combination of two or more the plurality of bots to deploy as the remediation process.

11. The system of claim 10, wherein the second RPA module is further configured to create a robotic script (bot) for the combination of the two or more of the plurality of bots that defines a remediation process for remediating the computing-related event.

12. The system of claim 7, further comprising;
a bot simulation module stored in the memory, executable by the at least processor and configured to, prior to deploying one or more bots as remediation for a computing-related event, execute the one or more bots in a simulated environment having substantially same parameters as the run-time production computing environment, and
wherein the bot determining module is further configured to determine which of the one or more previously created bots to deploy as the remediation process, based on executing the one or more bots previously created bots in the simulated environment.

13. The system of claim 1, further comprising:
a bot simulation module stored in the memory, executable by the at least processor and configured to, prior to deploying the bot as remediation for a computing-related event:
execute the bot in a simulated environment having substantially same parameters as the run-time production computing environment,
determine a likely acceptable level of performance for the bot in the run-time production computing environment based on a performance of the bot in the simulated environment, and
in response to determining the likely acceptable level of performance, authorize the bot for remediating the computing-related event.

14. The system of claim 1, further comprising:
a remediation performance evaluating module stored in the memory, executable by the at least one processor and configured to, in response to deploying the bot as a remediation process for a computing-related event, determine performance of the remediation process in a run-time production computing environment.

15. A computer processor-implemented method for remediating computing-related events, the method comprising monitoring, by a robotic process automation (RPA) computing module, a computing environment to detect occurrences of a computing-related event, wherein the computing-related event is a behavior occurring within the computing environment that deviates from a normal state;
in response to receiving notification of each occurrence of the computing-related event, recording, by a RPA computing module, actions performed to remediate the computing-related event; and
creating, by a RPA computing module, a robotic script (bot) that defines a remediation process for remediating the computing-related event based on the recorded actions and records (i) parameters of a run-time production computing environment in which the remediation process is deployed, and (ii) a level of performance of the remediation process in the computing environment.

16. The method of claim 15, further comprising in response to creating a plurality of bots and receiving notification of an occurrence of a computing-related event, determining, by a computing device processor, which of the plurality of bots to deploy as the remediation process.

17. The method of claim 16, wherein determining which of the plurality of bots to deploy as the remediation process, further comprises determining a combination of two or more the plurality of bots to deploy as the remediation process for the computing-related event and creating a bot comprising the two or more bots.

18. The method of claim 16, wherein determining which of the plurality of bots to deploy as the remediation process is based on at least one of (a) the computing-related event, (b) parameters of a run-time production computing environment in which the computing-related event occurred or a remediation process is to be deployed, (c) parameters of a run-time production computing environment in which the plurality of bots were previously deployed, and (d) performance of previous remediation processes in which the plurality of bots were previously deployed.

19. A computer program product, comprising:
a non-transitory computer-readable medium comprising codes for causing a computing device processor to:
monitor, by robotic process automation (RPA), a computing environment to detect occurrences of a computing-related event, wherein the computing-related event is a behavior occurring within the computing environment that deviates from a normal state;
in response to receiving notification of each occurrence of the computing-related event, record, by RPA, actions performed to remediate the computing-related event; and
create, by RPA, a robotic script (bot) that defines a remediation process for remediating the computing-related event based on the recorded actions and records (i) parameters of a run-time production computing environment in which the remediation process is deployed, and (ii) a level of performance of the remediation process in the computing environment.

20. The computer program product of claim 19, wherein the computer-readable medium further comprises codes for causing a computing device processor to, in response to creating a plurality of bots and receiving notification of an occurrence of a computing-related event, determine which of the plurality of bots to deploy as the remediation process.

* * * * *